United States Patent [19]

Woodruff

[11] Patent Number: 4,946,256
[45] Date of Patent: Aug. 7, 1990

[54] RIGHT ANGLE SHUTTER FOR LASER BEAM

[75] Inventor: David C. Woodruff, Mountain View, Calif.

[73] Assignee: NM Laser Products, Inc., Sunnyvale, Calif.

[21] Appl. No.: 295,895

[22] Filed: Jan. 11, 1989

[51] Int. Cl.⁵ ............................................. G02B 26/02
[52] U.S. Cl. .................................. 350/269; 250/498.1
[58] Field of Search ............... 350/269, 266, 484, 486, 350/632, 637, 487; 378/160, 145; 362/277, 278; 250/229, 498.1

[56] References Cited

U.S. PATENT DOCUMENTS

| | | | |
|---|---|---|---|
| 3,536,910 | 10/1970 | Ormrod et al. | 378/160 |
| 4,082,435 | 4/1978 | Zeitz | 350/269 |
| 4,170,731 | 10/1979 | Howell et al. | 350/266 |
| 4,332,450 | 6/1982 | Griffith | 354/234 |
| 4,415,231 | 11/1983 | Kaczensky et al. | 350/269 |
| 4,799,767 | 1/1989 | Woodruff | 350/269 |

FOREIGN PATENT DOCUMENTS 0079411  4/1987  Japan .................................. 350/269

OTHER PUBLICATIONS

IBM Technical Disclosure Bulletin, "Thyratron Light Shutter with Automatic Latching Action", E. G. Nassimbene, vol. 8, No. 1, Jun. 1965, p. 115.

Primary Examiner—Bruce Y. Arnold
Assistant Examiner—Ronald M. Kachmarik
Attorney, Agent, or Firm—Thomas Schneck

[57] ABSTRACT

A beam shutter having a flexible ferromagnetic blade with an upright end flap and an electromagnet for flexing said blade into or out of a beam path. The shutter includes a housing having one or two sets of openings in opposed side plates thereof so as to define one or two beam paths. The blade is mounted in the housing at one end of the blade and has a diagonal fold at the opposite end to define the flap. The electromagnet comprises a core with a U-shaped cross-section defining poles and wire windings about the core. The poles have a surface with an arcuate profile which curves away from the blade toward the end with the flap. The blade is normally in a straight position but flexes into a flexed position abutting the poles whenever the electromagnet is actuated. In one normally closed embodiment the flap intersects the beam path when in the straight position. In another normally open embodiment the flap intersects the beam path when in the flexed position. In a further embodiment with two sets of openings, one beam path is intersected in one position and the other beam path is intersected in the other position.

7 Claims, 3 Drawing Sheets

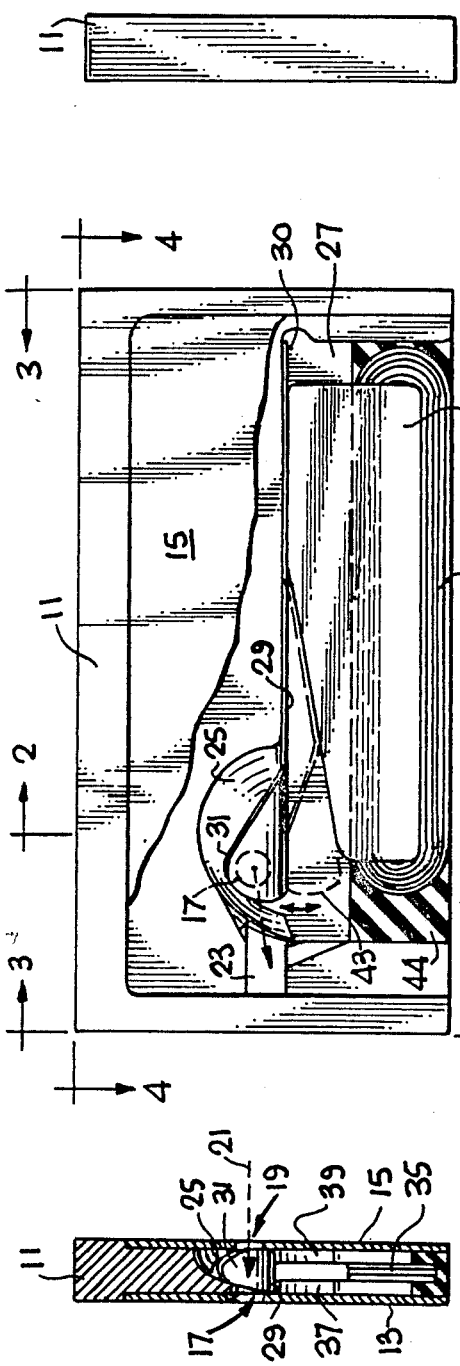

RIGHT ANGLE SHUTTER FOR LASER BEAM

TECHNICAL FIELD

The present invention relates to shutter mechanisms for laser beams, and in particular to shutters which are electromagnetically operated.

BACKGROUND ART

A typical shutter mechanism of the prior art includes an electromagnet comprising a ferrite core surrounded by a magnetic winding on a pancake bobbin and also includes a very thin elongated flexible foil steel strip attached by retaining screws at one end to a collar and lying parallel to and below a laser beam path when the electromagnet is inactive. In operation, the winding is energized, activating the magnet and causing the free end of the foil strip to be attracted to the magnet and bend upward into the beam path. As the end of the strip intercepts the beam path, the beam is reflected away from the path by a few degrees. The angle of reflection increases as the foil end approaches the magnet. In the fully closed position the strip conforms flat against the magnet and then bends sharply downward to the retaining screws, blocking the beam.

The foil strip is not only extremely flexible, but also has low mass which aids in reducing vibration caused by the collision of the strip with the electromagnet. However, the strip is also very weak, particularly at stress points in the bend, and thereby has a lifetime of only about 100,000 cycles before breakage occurs. The strip reflects the beam at an angle near that of the unaltered beam path, creating an unwanted stray reflection line that must be trimmed off. The orientation of the strip in the fully closed position allows laser light to be scattered back into the laser, preventing its use in certain applications. Thermally, the thin foil is not capable of conducting away sufficient heat arising from absorption high power laser light.

In U.S. Pat. No. 4,332,450 Griffith discloses a magnetically actuated optical shutter in which a magnetic field is provided in an air gap defined by a pair of poles of an electromagnet and a magnet is provided in the air gap with its field oriented at an angle to the first magnetic field. A lever pivoted about an axis entirely outside of the air gap and extending through one of the electromagnet's poles carries the magnet. An optical aperture is positioned in a path of the lever for selective obstruction by the lever. Interaction of the magnet with the magnetic field defined by the electromagnet causes the lever to pivot into or out of a position obstructing the aperture, thereby causing the lever to act as an optical shutter.

In U.S. Pat. No. 4,415,231, Kaczensky et al. disclose a "fail-safe" radiation shutter which includes a housing through which a defined beam path extends, two independently operated electromagnetic shutter devices arranged one behind the other relative to the beam path to intercept or pass the beam, and means for blocking the beam path with one of the shutter devices when a failure is sensed in the other. Each shutter device comprises a diaphragm or filter element fastened to the free end of a pivotally supported swivel arm and an electromagnetic actuator, such as a solenoid, arranged for tilting the swivel arm into a beam passing position. A spring fastened to the swivel arm returns the arm to a beam blocking position when the actuator is turned off.

An object of the present invention is to produce a laser beam shutter mechanism having long life and no stray reflection so as to be suitable for high speed pulse operation.

Another object of the present invention is to produce a shutter mechanism suitable for use with high power lasers and other beam sources.

A further object is to produce a shutter mechanism with smaller and thinner packaging so as to enable its use in application with tight space requirements.

DISCLOSURE OF THE INVENTION

The above objects have been met with a beam shutter having a housing comprising a frame provided with a hollow cavity and grooves therein and left and right side cover plates disposed against the frame. The plates have openings therein which define a beam path through the housing. A ferromagnetic blade is mounted at one end to an upper face of the cavity in the housing and has a diagonal bend at the opposite end forming an upright flap. At least the blade flap is reflective and the housing is absorptive of the beam. The shutter also includes an electromagnet comprising a core, preferably with a U-shaped cross section, and a wire winding wrapped about the core. The wound core is potted in a thermally conducting epoxy. The U-legs of the core define poles the upper surface of which have an arcuate profile corresponding closely to the shape the blade assumes when flexed. The electromagnet abuts the blade at the rear end and curves away toward the front of the housing.

The blade is attracted to the poles of the electromagnet when the latter is activated and flexes downward The blade springs back to a normally straight position when the electromagnet is turned off. In one of these two positions the blade flap intersects the beam path and thereby intercepts a beam, reflecting it toward a beam dump. The beam dump is defined by a narrow groove in the V-shaped absorptive housing frame in combination with a side plate. In the other position, the beam is not blocked by the blade and passes uninterrupted through the openings in the housing plates.

Another embodiment has two sets of openings in the housing. An upper set corresponds to the normally closed case where the blade flap intersects the beam path when the blade is straight, while a lower set corresponds to the normally open case where the blade flap intersects the beam path when the blade is in its fully flexed position. A beam can be directed through either set of openings, as desired. Alternatively, two beams with some differing characteristics, such as wavelength, energy or destination, can be directed through both sets of openings. In this situation the shutter acts as a beam switch that selects one or the other of the beams.

BRIEF DESCRIPTION OF THE DRAWINGS

FIG. 1 is a partially cutaway side elevation of a first embodiment of a beam shutter of the present invention.

FIG. 2 is a front-end sectional view taken along the line 2—2 in FIG. 1.

FIG. 3 is a front- or back-end elevation taken along either of the lines 3—3 in FIG. 1.

FIG. 4 is a partially cutaway top plan taken along the line 4—4 in FIG. 1 and showing hidden elements in phantom.

FIG. 5 is a partially cutaway side elevation of an electromagnet's core element used in the beam shutter of FIG. 1.

FIG. 6 is a front-end elevational view of the core element in FIG. 5.

BEST MODE FOR CARRYING OUT THE INVENTION

Figure 7:
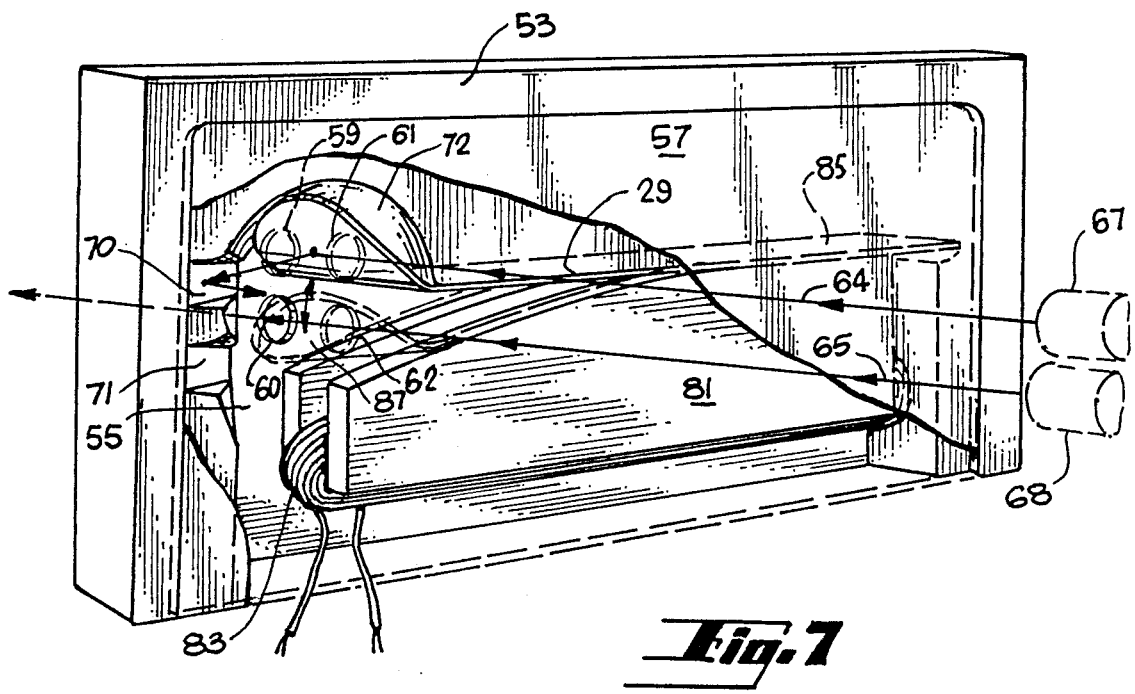
FIG. 7 is a partially cutaway perspective view of a second embodiment of a beam shutter of the present invention.

With reference to FIGS. 1–4, a beam shutter of the present invention includes a housing made up of a frame 11 and two flat plates 13 and 15 disposed, respectively, on the left and right sides of the frame. The plates 13 and 15 of the housing have openings 17 and 19 defined therein which provide a path for a beam 21 through the housing. Frame 11 of the housing is provided with grooves 23 and 25 therein forming, in combination with one of the plates 15, a V-shaped beam dump or light trap. Groove 25 also serves to provide a space for accommodating the bent-up flap described below. A hollow cavity 27 in frame 11, including groove space 25, contains the other elements of the shutter. Thermally conducting potting compound 44 fills in the volume surrounding the electromagnet.

The beam shutter also includes a flexible ferromagnetic blade 29 mounted at one end 30 to frame 11 in the housing. At the opposite end, the blade 29 has an upright diagonal bend therein defining a flap 31. Flap 31 is accommodated in groove space 25 and intersects the beam path through the holes 17 and 19 in the housing.

The beam shutter includes an electromagnet comprising a core 33 and a wire winding 35 wrapped lengthwise about core 33. As seen in FIGS. 5 and 6, core 33 is U-shaped in cross-section with a base 35 and two upright, spaced apart U-legs 37 and 39 defining poles. A channel 41, located between poles 37 and 39 and above base 35 accommodates the wire winding 35. As seen in FIG. 5, the top surface 41 of poles 37 and 39 has an arcuate or catenary profile corresponding closely to the shape blade 29 assumes when it is flexed.

Referring again to FIGS. 1–4, ferromagnetic blade 29 lies flat against an upper face of cavity space 27 in frame 11 and is affixed at rear end 30. Electromagnetic poles 37 and 39 abut against blade 29 at rear end 30 but because of the pole's surface profile curves away from blade 29 toward the front end of the shutter housing. In operation, when the electromagnet is powered up, the blade 29 is attracted to the poles 37 and 39 and as a consequence the blade flexes downward into the flexed position 43, seen in phantom in FIG. 1. When the electrical power to the electromagnet is turned off, the attraction ceases and blade 29 springs back to its normally straight position. In order to reduce vibrations caused by the impact of the moving blade against the poles 37 and 39 and against the upper face of cavity space 27, thermally conductive elastomeric members, not shown, may be disposed on the pole surfaces and on the cavity face.

Figure 8:
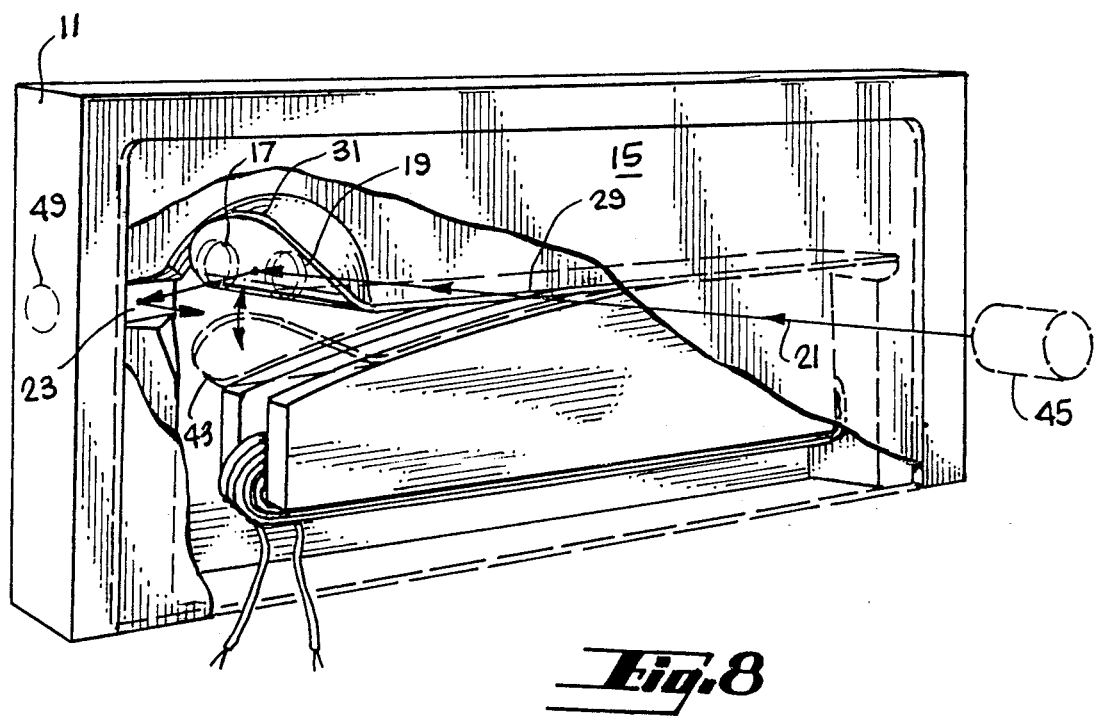
FIG. 8 is a partially cutaway perspective view of the embodiment of FIG. 1, illustrating operation of the beam dump for light incident from the right with the blade element in its normally closed position, and also showing the open position of the blade element in phantom.

With reference to FIGS. 4 and 8, a beam source 45, shown in phantom, such as a laser, produces a beam 21 directed along a beam path. The beam passes through opening 19 in right side cover plate 15 and is incident on upright flap 31 of blade 29. The beam is reflected by flap 31 into a beam dump, such as the groove 23 forming a V-shaped light trap in combination with cover plate 15, and absorbed. In order to improve beam reflection, blade 29, and particularly flap 31, may be coated with a metal highly reflective of the beam, such as aluminum, gold or nickel. Likewise, all elements other than the blade 29, and particularly the housing elements 11, 13 and 15, may be blackened to improve absorption.

The beam is incident through the sides of the shutter and thus at some angle relative to the length of the blade 29. Typically, holes or openings 15 and 17 in the side plates 13 and 15 of the housing are aligned opposite one another so that the incident beam path 21 is substantially perpendicular to the length of the blade 29. The upright bend formed in the blade 29 to produce flap 31 is generally at a diagonal, and preferably oriented at a 30° to 45° angle with respect to the incident beam, i.e. at a 60° to 45° angle with respect to the length of the blade. As a result, the reflected beam is directed approximately lengthwise toward beam dump 23. When the electromagnet 33 is actuated the blade 29 flexes downward into position 43, shown in phantom, and is no longer obstructing the beam path 21. Accordingly, the beam passes straight through both openings 17 and 19 and the shutter is "open". When the electromagnet is turned off the blade 29 returns to its original beam blocking position and the shutter is considered to be "closed". The embodiment thus far described is normally closed.

Figure 9:
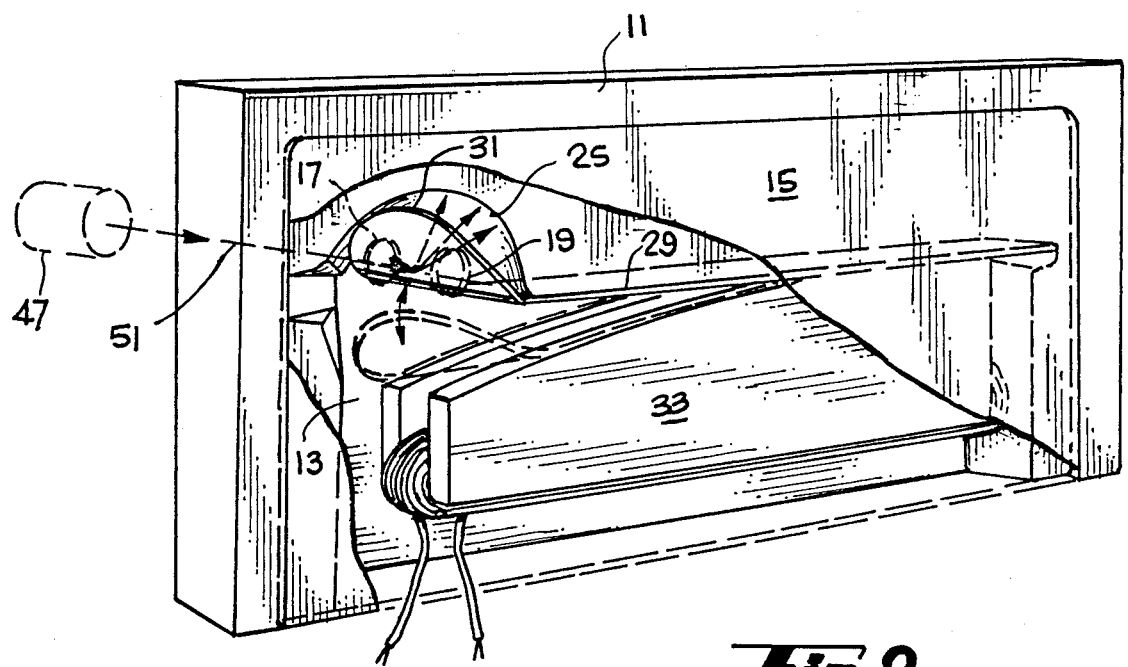
FIG. 9 is a partially cutaway perspective view of the embodiment in FIG. 8 illustrating operation of a second beam dump for light incident from the left.

With reference to FIG. 9, a beam source 47, such as a laser, produces a beam 51 directed along a beam path in the opposite direction from that seen in FIG. 8. The beam is incident from the left and passes through opening 17 in left side cover plate 13 and then impinges on upright flap 31 of blade 29. The beam is reflected by flap 31 into a beam dump 25 formed from a cutout channel in frame 11 in combination with right side cover plate 15. Again, blade 29 is coated with a metal so as to be reflective of the beam, while the other elements, and particularly housing elements 11, 13 and 15, including beam dump 25 are blackened to improve absorption of beam energy. The narrow V-shaped beam dump 25 may be lengthened, if desired, to improve absorption. As the upright bend formed in the blade 29 is generally at a diagonal, the reflected beam is directed approximately lengthwise, i.e. along the length of blade 29, into beam dump 25. When the electromagnet 33 is actuated the blade 29 flexes downward out of the beam path. The beam passes straight through both openings 17 and 19. As seen in FIGS. 8 and 9, the same shutter can operate with the beam incident from either left or right sides. Alternatively, an opening 49, seen in phantom in FIG. 8, can be defined in the front face of frame 11 which connects to channel 23. In this optional embodiment, the device acts as a switch to direct an incident beam 21 from the right to either of two directions, i.e. to the front or to the left. The device acts as a shutter for beams 51 in FIG. 9 incident from the left.

With reference to FIG. 7, a second embodiment of the beam shutter has a housing with a frame 53 and left and right side plates 55 and 57 disposed against frame 53. The plates 55 and 57 have openings 59–62 defined therein which provide two closely spaced paths through the housing for two beams 64 and 65 produced by beam sources 67 and 68. Frame 53 is provided with grooves 70–72 therein forming beam dumps, in combination with plate 57. Groove 72 also provides a space for accommodating an upright blade flap 75. A hollow cavity 77 in frame 53, including the groove 72, contains the other elements of the device.

The device includes a flexible ferromagnetic blade 79 mounted at one end 81 to frame 53 in the housing. At the opposite end, the blade 79 has an upright diagonal bend therein defining flap 75. Flap 75 intersects the upper beam path through the upper set of holes 59 and 61 in the housing. The device also includes an electromagnet comprising a core 81 and a wire winding 83 wrapped lengthwise about core 81. The shape of core 81 is the same as that seen in FIGS. 5 and 6 and described above. Ferromagnetic blade 79 lies flat against the upper face of cavity space 77 in frame 53 and is affixed at rear end 85. Poles of the electromagnet's core 81 abut against blade 79 at rear end 85, but because the top surfaces of these poles have an arcuate or catenary profile, the poles curve away from blade 79 toward the front end of housing 53. The profile corresponds closely to the shape blade 79 assumes when it is flexed.

Two beam sources 67 and 68, such as lasers, produce beams 64 and 65 directed along upper and lower beam paths. Typically, the beams would not be identical but would instead have some distinguishing characteristic, such as wavelength, energy or destination, which is different for the two beams. The upper beam 64 passes through opening 61 in right side cover plate 57 and is incident on upright flap 75 of blade 79. The beam 64 is reflected by flap 75 into a beam dump, such as the V-shaped light trap defined by groove 70 and cover plate 57. The lower beam 65 passes through opening 62 in right side cover plate 57, straight through the house and out through opening 60 is left side cover plate 55.

In operation, when the electromagnet is powered up, the blade 79 is attracted to the poles of electromagnet core 81 and as a consequence flexes downward into the flexed position 87, shown in phantom. When the electrical power to the electromagnet is turned off, the attraction ceases and blade 79 springs back to its normally straight position. As with the embodiment in FIGS. 1–4, the pole surfaces of the electromagnet core 81 and the upper face of cavity space 77 in frame 53 may have elastomeric members disposed thereon to damp vibrations from the impact of the blade.

In the flexed position 87, shown in phantom, lower beam 65 is intercepted by upright flap 75 and reflected into a beam dump defined by groove 71 and cover plate 57. On the other hand, upper beam 64 is no longer blocked and passes straight through openings 59 and 61 in the housing. Accordingly, the device in FIG. 7 acts as a kind of self-synchronous switch turning on upper beam 64 while simultaneously turning off lower beam 65, and vice versa. The device also operates as a switch for beams incident from the left through openings 59 and 60 in left side cover plate 55, where the beam dumps for the upper and lower beams are defined by the combination of groove 72 and cover plate 57 and by the combination of flexed blade 79 and the upper face of cavity space 77. In the later case, the blade 79 may also be blackened in its rear portion, while the flap 75 is reflective.

Figure 10:
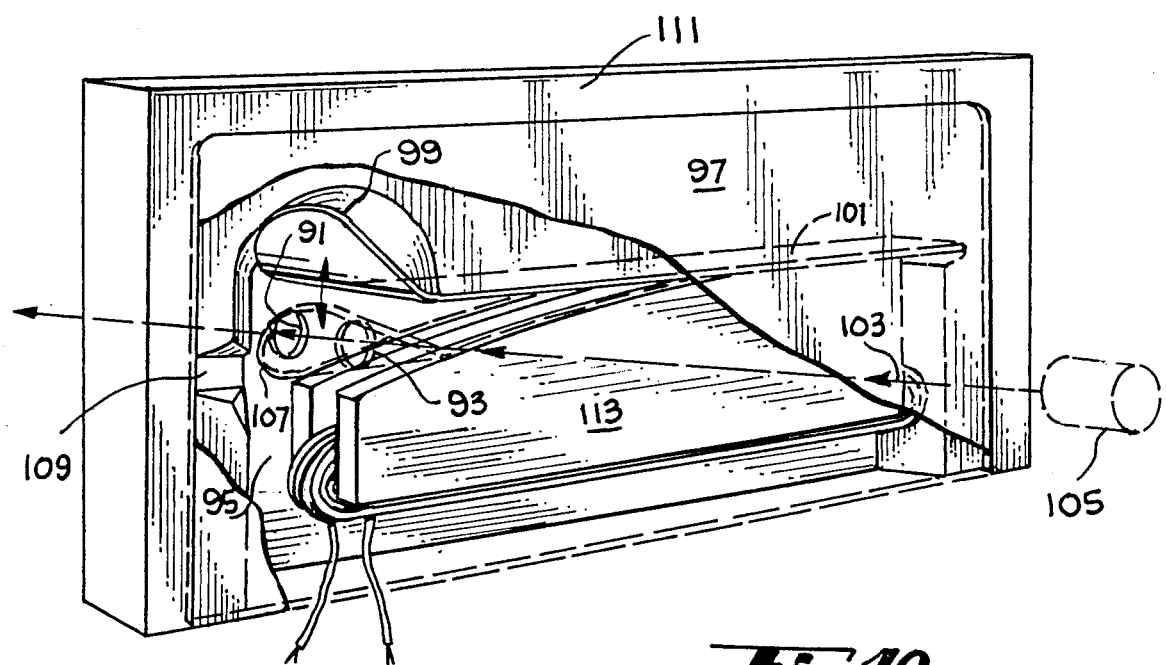
FIG. 10 is a partially cutaway perspective view of a third embodiment of a beam shutter of the present invention with a blade element in a normally open position.

With reference to FIG. 10, a third embodiment of the beam shutter is identical to the first embodiment in FIGS. 1–4 except that the openings 91 and 93 in cover plates 95 and 97 are positioned slightly lower so that the upright flap 99 of blade 101 does not intercept the path of beam 103 from source 105 through openings 91 and 93 when it is in its normally straight position. Instead, flap 99 intercepts beam 103 when blade 101 is in its flexed position 107, seen in phantom. Groove 109 in frame 11 is also positioned lower than groove 23 in FIG. 1, so as to form, in combination with cover plate 97, a beam dump for the reflected beam. The electromagnet 113 in this embodiment is unchanged from that described for the first embodiment of FIGS. 1–4. While the first embodiment in FIGS. 1–4 is a normally closed beam shutter and the second embodiment is a beam switch, the third embodiment in FIG. 10 is a normally open beam shutter.

I claim:

1. A shutter mechanism for shuttering a laser beam directed along a path from a source comprising,
   a housing having a set of openings in opposed sides thereof so as to define a first beam path therethrough,
   a flexible ferromagnetic blade mounted in said housing at one end and having a fold at an opposite free end defining an upright blade flap, said blade being oriented in a lengthwise direction from end to end of said housing such that said first beam path is at an angle to the length of said blade, said fold being oriented at a diagonal with respect to the length of said blade, said blade being normally in a straight position and being flexible into a flexed position, said blade flap being reflective and intersecting said first beam path through said sides of said housing when in only one of said straight and flexed positions, and
   electromagnetic means for flexing said blade into said flexed position.

2. The shutter of claim 1 further comprising light trap means in said housing for absorbing a beam reflected at an angle by said blade flap to an approximately lengthwise direction into said light trap means.

3. The shutter of claim 1 wherein said electromagnetic means comprises an elongated core with a U-shaped cross-section and a wire winding lengthwise about said core, U-legs of said core defining poles with a channel therebetween accommodating said winding, said poles having a surface with an arcuate profile corresponding closely to the shape of said blade on said flexed position, said core abutting against said blade at said one end and curving away from said blade toward said opposite end.

4. The shutter of claim 3 further comprising elastomeric members disposed on said poles.

5. The shutter of claim 1 further comprising a second set of openings in said opposed sides of said housing so as to define a second beam path therethrough, said blade flap intersecting said first beam path in one of said straight and flexed positions and intersecting said second beam path in the other of said straight and flexed positions.

6. The shutter of claim 1 wherein a third opening is defined in said housing in a reflected path for a beam reflected from said first beam path by said blade flap.

7. A shutter mechanism for shuttering a laser beam directed along a path from a source comprising,
   a housing having a first set of openings in opposed sides thereof so as to define a first beam path therethrough and also having a second set of openings in said opposed sides so as to define a second beam path therethrough, a flexible ferromagnetic blade mounted in said housing at one end and having a diagonal fold at an opposite free end defining an upright blade flap, said blade being normally in a straight position and being flexible into a flexed position, said blade being reflective, said blade flap intersecting said first beam path through said housing in one of said straight and flexed positions and intersecting said second beam path through said housing in the other of said straight and flexed positions, and electromagnetic means for flexing said blade into said flexed position.

* * * * *